April 3, 1951     W. G. BOSWORTH     2,547,738
ROTATING CUTTING DISK TYPE LAWN MOWER
Filed March 25, 1946     3 Sheets-Sheet 1

INVENTOR.
WELLINGTON G. BOSWORTH,
BY
Justin T. Macklin
ATTY

April 3, 1951 W. G. BOSWORTH 2,547,738
ROTATING CUTTING DISK TYPE LAWN MOWER
Filed March 25, 1946 3 Sheets-Sheet 2
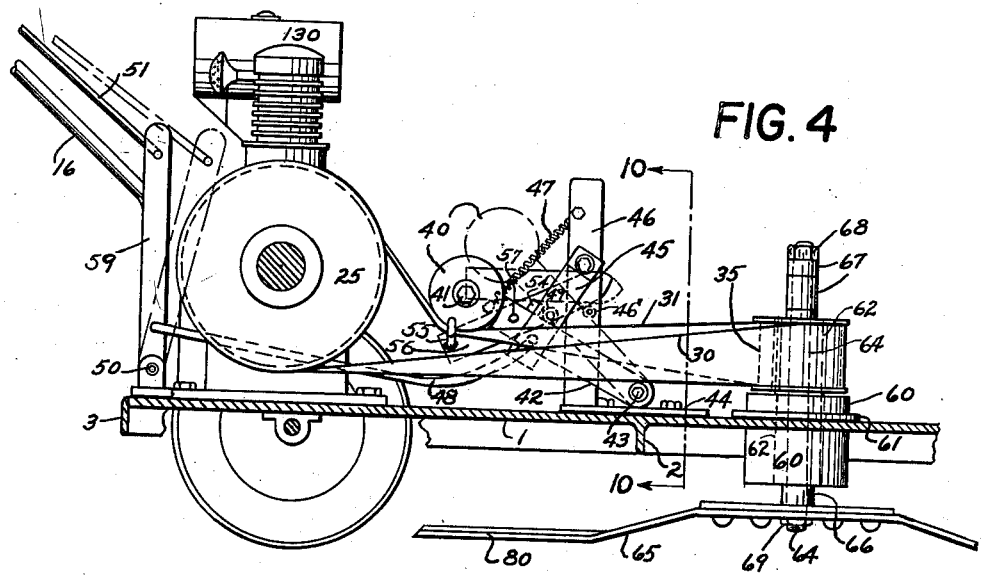
FIG. 4
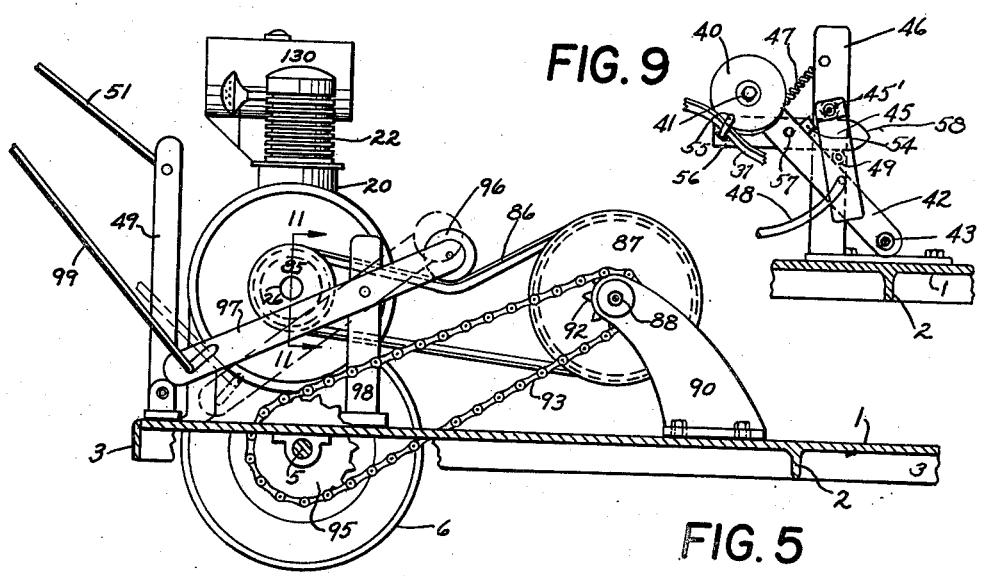
FIG. 9
FIG. 5
INVENTOR.
WELLINGTON G. BOSWORTH,
BY
Justin W. Macklin
ATT'Y April 3, 1951 W. G. BOSWORTH 2,547,738
ROTATING CUTTING DISK TYPE LAWN MOWER
Filed March 25, 1946 3 Sheets-Sheet 3
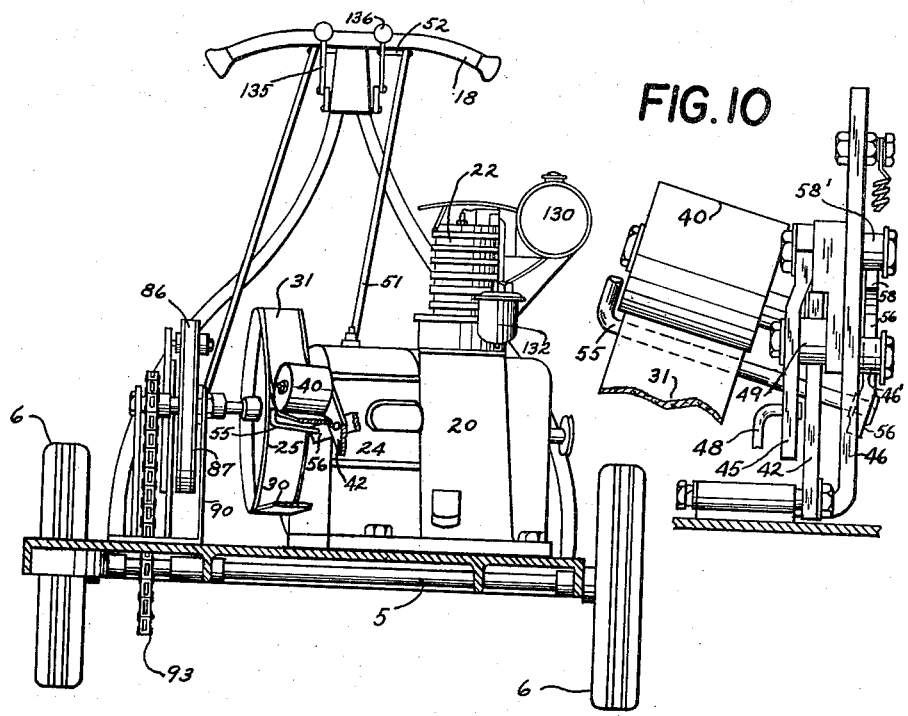
FIG. 10
FIG. 6
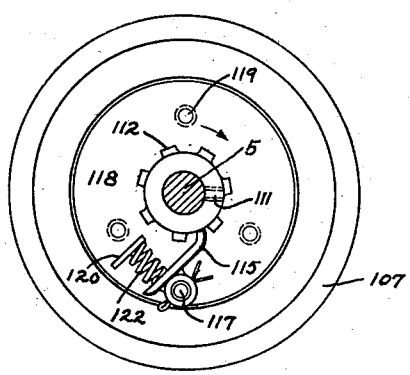
FIG. 8
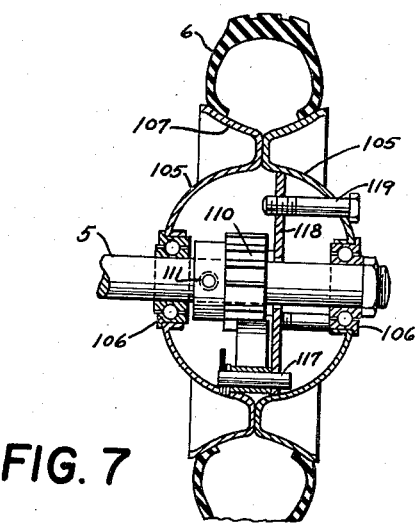
FIG. 7
INVENTOR.
WELLINGTON G. BOSWORTH,
BY
Justin W. Macklin
ATT'Y Patented Apr. 3, 1951

2,547,738

UNITED STATES PATENT OFFICE 2,547,738

ROTATING CUTTING DISK TYPE LAWN MOWER

Wellington G. Bosworth, Lakewood, Ohio

Application March 25, 1946, Serial No. 656,827

4 Claims. (Cl. 56—25.4)

This invention relates to lawn mowers of a type particularly known as having a rotary free blade cutting knife, as distinguished from the type wherein the blades coact with a stationary or movable shearing edge.

Objects of the invention include the provision of a power driven cutter and power propelled lawn mower machine which may be easily handled and controlled, is effective in operation, and is capable of cutting close to trees, walls and other objects.

Further objects include making the rotary cutter blade of the type which revolves on a horizontal plane and is adjustable vertically and which creates a strong upward current of air lifting the grass into the path of the rapidly revolving cutting edges.

Other objects include arranging the power source and drive so that an effective transmission is accomplished with minimum of wear on the belt.

A more specific object is to so mount the engine and its driving wheel as to secure the best direction of transmission while attaining balance of the weight over the main supporting pair of wheels, while a dirigible front wheel or caster cooperates to provide easy maneuverability. Another difficulty overcome by the present arrangement is that of securing simple effective power transmission to the load-carrying wheels for propulsion.

Other objects include power throw-off or disconnecting means for the drive so that the mower may be moved readily while the cutting blade member is idle, and specific objects also pertain to simple and effective arrangement of control, accessibility to the parts, simplicity of construction and convenience of operation.

Other objects will become apparent during the course of the following description, in which:

Fig. 4 is a longitudinal section taken on a plane indicated by the line 4—4 of Fig. 2.

Fig. 5 is a similar view taken on a parallel plane indicated by the line 5—5 of Fig. 2, some of the parts behind those shown in this figure being omitted for clearness of illustration.

Figure 1:
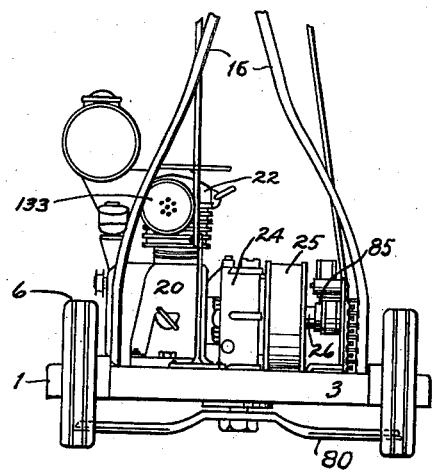
Fig. 1 is a rear elevation of a lawn mower constructed in accordance with this invention.
Figure 3:
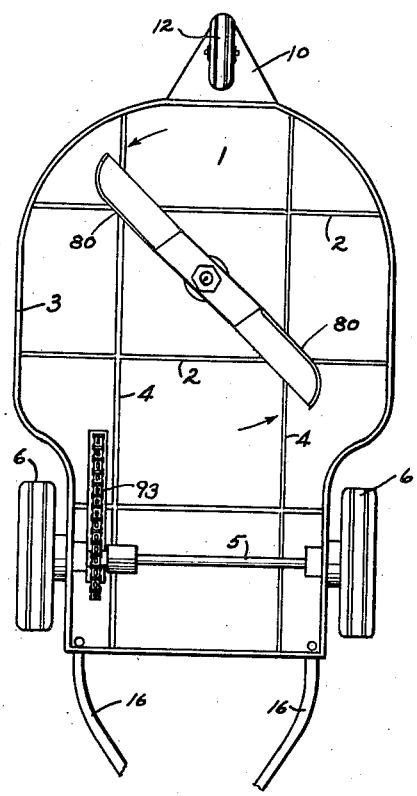
Fig. 3 is a bottom plan.
Figure 2:
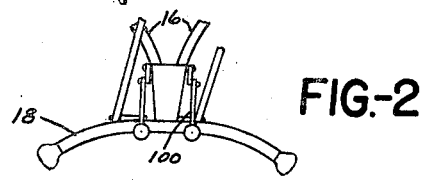
Fig. 2 is a plan view of the same.

Fig. 6 is a transverse sectional view taken on offset planes indicated by the lines 6—6 of Fig. 2. Figs. 4, 5 and 6 are drawn on a scale somewhat enlarged over Figs. 1, 2 and 3.

Fig. 7 is a still further enlarged sectional view through one of the drive wheels showing a differential or over-running drive connection.

Fig. 8 is a sectional side elevation of the driving connection of Fig. 7.

Fig. 9 is a detail view showing the belt roller of Fig. 4 and the supporting and coacting parts in the idle position.

Fig. 10 is an enlarged elevation of the belt tensioning and braking device taken on a plane indicated by the line 10—10 of Fig. 4.

Figure 11:
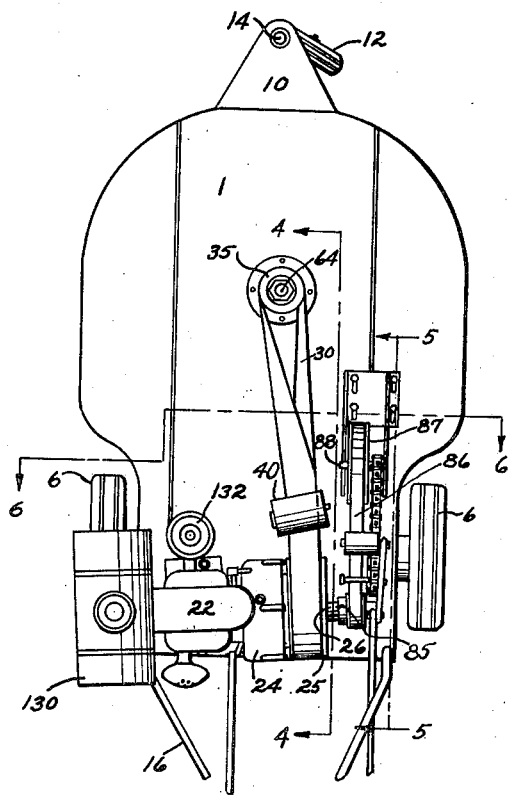
Figure 11:
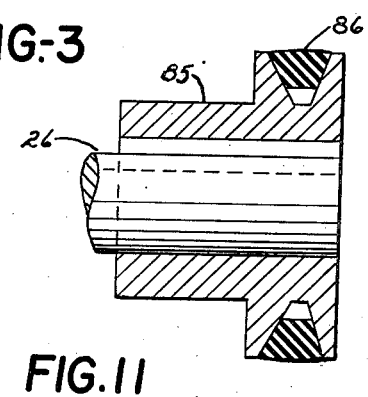

Fig. 11 is an enlarged sectional detail through the V-belt pulley on the engine shaft.

Referring to the drawings, 1 indicates a platform frame having a forward portion of sufficient width to overhang the circular path of the ends of the cutter blades, and a rearwardly extending narrowed portion beneath which extends a transverse axle 5 for the main supporting and driving wheels 6.

The supporting platform 1 is preferably of sheet metal having a peripheral flange 3 extending downwardly to afford stiffness and additionally guard the rotating blade. Transverse and longitudinal ribs 2 and 4 may lend additional strength.

At the forward end a bracket 10 is extended outwardly to provide support for a caster wheel 12, movable about a vertical pivot 14, Fig. 2. Rigid bars or tubular members attached at the rear corners of the platform 1 extend upwardly and converge rearwardly, as shown at 16, and are rigidly connected with a transverse handle 18 for moving and steering, and to which are also attached control members, as will be later described.

As indicated, it is desirable to have the weight of the engine and driving parts balanced with relation to the rest of the structure over the axle 5 on the wheels 6.

A power plant of suitable construction capable of driving the cutter and propelling the machine takes certain characteristic size and shape, and the mounting and connection with the drive members presents mechanical problems which are overcome by the arrangement shown.

An internal combustion engine having a frame 20 and a cylinder extending upwardly therefrom, as indicated at 22, and having a rigid reduction gear box 24, is so mounted on the platform 1 as to clear the driving wheels 6 at the left of Fig. 1 and to position its driving pulley 25 on the drive shaft 26 as nearly midway between the wheels 6 as possible. However, because the drive wheel is still several inches at the right of the center line, Figs. 1 and 2, the engine is mounted at an angle such that the belt 30, fitted on the flanged drive wheel 25, may be turned to pass around the cutter driving pulley 35 in a line or plane passing directly through the middle of the drive wheel 25. If a line or plane through the middle of the driving pulley 25 and at right angles to the axis of the pulley be continued toward the cutter driving pulley 35, it would be tangent to the belt surface of the latter pulley. Thus, as the belt leaves the underside of the pulley 25 and turns one-half turn, it runs onto the driven pulley in the correct manner to avoid side strain or tendency to run off. The return reach 31 of the belt is guided to the upper side of the drive pulley 25 by the roller 40 mounted at a slight angle to the axis of the pulley and carried on an arm 42 pivoted at 43 to a bracket 44 secured to the frame 1. The arm 42 may be latched in its belt-tightening position by an arm 45 pivoted at 45' to an upright arm 46, and having a roller 49 engaging the upper edge of the arm 42 and adapted to stand against a stop 54 where action of the spring 47 tending to lift the roller 40 and arm 42 holds the parts in this latched position. When the arm 45 is swung to the right to the position shown in Fig. 9 the spring 47 raises the roller, as there shown, and this releases the driving tension on the belt.

A belt engaging finger 55 extending beneath the upper reach 31 of the belt is rigidly carried on an arm 56 having a scissors motion with relation to and pivoted on the arm 42, and having a cam surface 58 engaging beneath a roller 58' on the upright 46 so that when the arm 42 swings upwardly this finger engages beneath the belt 31 snubbing it between the finger and roller 40, thus acting as a brake to stop the belt, and at the same time holding it in loose relation to both pulleys 25 and 35. As the arm 42 and roller 40 swing downwardly the arm 56 bearing on a roller at 46' swings the finger 55 away from the roller 40 and free from the belt while it is running.

To swing the arm 45 to and from latching position, a link 48 may connect through a latch arm 59 pivoted at 50 to the frame, and connected in turn through a rod 51 to a hand lever 52 at the handle 18.

Mounted on the plate 1 is a spindle housing 60 extending through the plate and having a flange 61 resting on top of the plate and containing a hollow spindle 62, carrying the pulley 35, and through which the rotary cutter shaft 64 extends carrying the cutter 65 at the lower end.

The shaft 64 projects above the pulley 35 at the upper end, through interchangeable collets 67 and secured by a nut 68. At the lower end of the shaft 64 is shown an interchangeable collar or collet 66 against which the cutter member is held by a nut 69. Thus, by shifting the collets of different sizes from above the spindle to the lower end of the shaft and tightening them in place by the nuts 69 and 68 the plane of the cutter may be varied to suit the cutting conditions.

The cutter itself preferably comprises a pair of arms of substantially uniform width, say, approximately two inches or more, and having an offset central portion provided with a reinforcing plate, and having an opening fitting over the shaft 64. The cutting ends, indicated at 80, are slightly tilted, say, about five degrees more or less, to create an updraft of air as the cutter is rotated rapidly.

Because of the position of the engine by which the most effective approach of the driving belt 30 as it passes on the lower reach from the pulley 25 to the pulley 35 is attained, I am presented with another problem in driving, namely, that of securing an efficient driving connection between the shaft 26 and the axle shaft 5, which, it will be seen, are thus at a slight angle to each other. However, I have found an effective durable drive may comprise a V-belt and V-pulleys 85 on the shaft 26 and 87 on a counter shaft 88, the belt being indicated at 86. By mounting the counter shaft 88 a suitable distance from the shaft 26, as shown on a bracket 90, rising from the frame plate 1 and by selecting a V-belt of sufficient radial thickness and suitable angle of cross section, I am enabled to transmit the driving power from the shaft 26 to the shaft 88 without undue frictional losses.

The groove of the pulley 85 for receiving the V-belt may have one of its sloping surfaces at a wider angle than the other, as particularly shown in Fig. 9, to partially compensate for the angle of approach of the belt running over the same, and which reduces the tendency of the belt to climb out of the pulley and aids in avoiding wear.

On the shaft 88 is a sprocket 92 and a sprocket chain 93 running over the same, and a sprocket preferably larger, as indicated at 95, fixed on the axle 5 may complete the driving connection to the axle shaft.

To disconnect this drive, it is only necessary to provide looseness in the belt 86 and tighten the same by a tightening roller 96 carried on a lever 97 pivoted on an upright 98 and connected through a rod 99 with an operating hand lever 100 on the handle 18.

To permit over-running of either of the drive wheels 6 with relation to the other, I have provided a simple, effective and durable ratchet connection, shown particularly in Figs. 7 and 8.

The wheels are preferably of the disk type formed of two members having substantially hemispherical portions 105, flanged to fit roller bearings 106 on the shaft 5, and extending outwardly at 107 to form tire-receiving flanges.

Within the housing formed by the portions 105 I provide a hob-gear member 110, rigidly fixed to the shaft 5 as by a screw 111, and having its teeth 112 of widely separated form to receive an end of a driving dog 115 pivotally carried on the pin 117, in turn rigidly mounted in a plate 118 held by screws 119 to one of the wheel members 105.

Fixed on the plate 118 is shown an abutment 120 and a compression spring 122 mounted between the abutment and the dog 115 acting to throw the hooked inner end of the dog into engagement with the teeth 112, as shown in Fig. 8.

Assuming that the shaft 5 is rotating in a clockwise direction in Fig. 8, it will be seen that engagement of one of the teeth 112 with the dog 115 will transmit driving force to the wheel through the pin 117. Assuming that the wheel continues to revolve in the same direction while the shaft rotates more slowly or remains stationary, the end of the driving dog will ride idly over the teeth 112.

Thus, it will be seen that by arranging the driving dogs at either end of the shaft 5 to drive the wheels 6 forwardly, either wheel may overrun the shaft in differential fashion.

Likewise, with the motor and drive entirely stationary, the cutter frame may be moved on the wheels in a forward direction and may be turned either way without transmitting the power to the shaft and driving connections.

For backing up the machine, however, the sprocket wheels would be rotated through the chain 93, but by relieving the tension on the V-belt 86 by lifting the roller 96 as described, the backward motion may be accomplished quite freely. Referring again to the engine 20, a suitable fuel storage tank 130 may supply gasoline or other fuel to a carburetor indicated at 132, a muffler is indicated at 133, and throttle and spark controls may be connected to appropriate hand levers 135 and 136, shown in Fig. 6 as mounted at the handle 18.

The intermediate connections may be by rod or cable to the appropriate controls at the motor. These and other parts are not shown, being omitted as unnecessary.

For the present purpose it is only necessary to note that the motor is provided with standard fittings and controls.

The balance of the weight of the parts is such that the center of gravity is normally slightly forward of the axle 5 and driving wheels 6. If, however, it is desired to adjust the cutter, the handle may be lowered toward the ground until the rear flange 3 rests on the ground, in which position the center of gravity will be slightly to the rear of the axle 5 and the machine will remain in the uptilted position.

From the foregoing description it will be seen that I have provided a grass cutting machine comprising a chassis which is simple, durable and easy to maneuver, and which will cut close to obstructions while the cutter revolves within the area of the frame and in a guarded position.

The machine is effectively power driven for rotating the cutter and for propelling the machine, the supporting and driving wheels being positioned within the distance across the frame; and I have so mounted the motor as to provide direct belt drive to the vertical shaft carrying the cutter and positioned approximately centrally or equidistant from the drive wheels and the front dirigible wheel; and have also provided for appropriately geared simple driving connection to the drive wheel shaft; and in addition have provided a novel over-running ratchet connection between said shaft and each of the drive wheels; likewise, I have provided simple and convenient means for rendering the drive connection idle, both between the engine and the cutter and between the engine and the traction shaft.

As above indicated, I am able to use a motor of compact form but sufficiently large to give ample power for simultaneously driving the cutter and propelling the machine while utilizing the effective driving connections described.

Various modifications may be made in details of construction without departing from the spirit of the present invention and within the scope of the appended claims.

Having thus described my invention, what I claim is:

1. The combination of a frame, a driving axle and supporting and driving wheels thereon at one end of the frame, a caster wheel at the other end of the frame, a vertical shaft carried by the frame at approximately mid-position between the three supporting wheels, a rotary cutter on said shaft, a motor mounted on the frame between the driving wheels having a main driving shaft and a pulley thereon for a flat belt, a pulley on the vertical shaft, a belt connecting said two pulleys, an idler roller movable into and out of tensioning position against said belt, a V-pulley on said main driving shaft, a jack-shaft mounted on the frame and a V-pulley thereon, a V-belt running over said V-pulleys, a manually operated idler roller for tensioning said belt, sprocket and chain connections from the jack shaft to the drive shaft, and overrunning connections between the jack shaft and the drive wheels adapted to drive in a forward direction only.

2. The combination of a frame, a driving axle and supporting and driving wheels thereon at one end of the frame, a caster wheel at the opposite end of the frame, a vertical shaft carried by the frame, a rotary cutter on said shaft between the supporting wheels, handles projecting upwardly from the rear of the frame, a motor mounted on the frame between the driving wheels having a main driving shaft and a pulley thereon for a flat belt, and aligned with the vertical shaft, a pulley on the vertical shaft, a belt connecting said two pulleys, an idler roller movable into and out of tensioning position against said belt, a V-pulley on the main driving motor shaft, a jack shaft and a V-pulley thereon, a V-belt running over said V-pulleys, and an idler roller for tensioning said belt, sprocket and chain connections from the jack shaft to the drive shaft, and connections between the steering handle and said idlers to connect and disconnect the power to the cutter and the driving wheels.

3. In a machine of the character described, the combination of a platform having a narrowed portion, a driving and supporting axle having over-running driving wheels opposite the narrowed portion of the platform, a support at the forward end of the platform having a caster wheel, a rotary cutter beneath the platform, a vertically adjustable shaft carrying the cutter and extending through the platform and having a belt pulley, an engine mounted on the platform to the rear of and between the driving wheels and having a main driving shaft and belt pulley thereon rotating in a plane passing through the cutter shaft, a belt running over said pulleys, a pair of V-belt pulleys and a connecting V-belt one of which pulleys is on the engine driving shaft, a sprocket and chain connection from the other V-pulley to the drive shaft, and manually controlled means for disconnecting the cutter drive and the axle drive.

4. The combination described in claim 2 in which means is associated with the idler roller for engaging and holding the belt when the roller is moved to the belt-loosening position.

WELLINGTON G. BOSWORTH.

REFERENCES CITED

The following references are of record in the file of this patent:

UNITED STATES PATENTS

| Number | Name | Date |
| --- | --- | --- |
| 2,160,259 | Cooper | May 30, 1939 |
| 2,192,762 | Vincze | Mar. 5, 1940 |
| 2,203,198 | Junge | June 4, 1940 |
| 2,232,671 | Loder | Feb. 18, 1941 |
| 2,329,372 | Hitch | Sept. 14, 1943 |